US012599962B2

(12) United States Patent (10) Patent No.: US 12,599,962 B2

Larouche (45) Date of Patent: Apr. 14, 2026

(54) SYSTEM AND METHOD FOR TREATING ADDITIVE POWDER

(71) Applicant: AP&C Advanced Powders & Coatings Inc., Boisbriand (CA)

(72) Inventor: Frederic Larouche, Saint-Colomban (CA)

(73) Assignee: AP&C Advanced Powders & Coatings Inc., Boisbriand (CA)

( * ) Notice: Subject to any disclaimer, the term of this patent is extended or adjusted under 35 U.S.C. 154(b) by 76 days.

(21) Appl. No.: 16/776,571

(22) Filed: Jan. 30, 2020

(65) Prior Publication Data

US 2021/0237151 A1      Aug. 5, 2021

(51) Int. Cl.
| | |
|---|---|
| B22F 1/16 | (2022.01) |
| B22F 1/145 | (2022.01) |
| B33Y 40/10 | (2020.01) |
| B33Y 70/00 | (2020.01) |

(52) U.S. Cl.
CPC ................ B22F 1/16 (2022.01); B22F 1/145 (2022.01); B33Y 40/10 (2020.01); B33Y 70/00 (2014.12); *B22F 2301/052* (2013.01); *B22F 2301/15* (2013.01); *B22F 2301/205* (2013.01)

(58) Field of Classification Search
None
See application file for complete search history.

(56) References Cited

U.S. PATENT DOCUMENTS

| | | | | |
|---|---|---|---|---|
| 3,767,477 | A | * | 10/1973 | McCabe .............. G03G 9/1075 |
| | | | | 148/287 |
| 6,811,765 | B1 | | 11/2004 | Maiwald et al. |
| 8,409,371 | B2 | | 4/2013 | Watanabe et al. |
| 9,682,166 | B2 | | 6/2017 | Watanabe |
| 9,981,315 | B2 | | 5/2018 | Rieken et al. |
| 10,058,918 | B2 | | 8/2018 | Espinal et al. |
| 2010/0286432 | A1 | * | 11/2010 | Tateno ................... B01J 35/023 |
| | | | | 558/330 |
| 2017/0326641 | A1 | | 11/2017 | Lee et al. |
| 2018/0161870 | A1 | | 6/2018 | Chen et al. |
| 2018/0161882 | A1 | | 6/2018 | Stawovy et al. |
| 2018/0193916 | A1 | * | 7/2018 | Lou ........................ B33Y 10/00 |
| 2018/0214956 | A1 | | 8/2018 | Larouche et al. |
| 2018/0339336 | A1 | | 11/2018 | Espinal et al. |
| 2018/0369907 | A1 | | 12/2018 | Dial et al. |
| 2019/0001416 | A1 | | 1/2019 | Larouche et al. |
| 2022/0134424 | A1 | | 5/2022 | Mohanty et al. |

FOREIGN PATENT DOCUMENTS

| | | |
|---|---|---|
| CA | 3003502 A1 | 5/2017 |
| EP | 2218529 A1 | 8/2010 |

OTHER PUBLICATIONS

Duan, Fluidized bed coupled rotary reactor for nanoparticles coating via atomic layer deposition, Review of Scientific Instruments, 86, 2015, 075101, p. 1-8 (Year: 2015).*
Jamesh, Thermal oxidation of titanium: Evaluation of corrosion resistance as a function of cooling rate, Materials Chemistry and Physics, 138 (2013), p. 565-572 (Year: 2013).*
Didden, Fluidized-bed atomic layer deposition reactor for the synthesis of core-shell nanoparticles, Review of Scientific Instruments, 85, 2014, 013905, p. 1-8 (Year: 2014).*

* cited by examiner

*Primary Examiner* — Tabatha L Penny

(74) *Attorney, Agent, or Firm* — Dority & Manning, P.A.

(57) ABSTRACT

A system and method for treating additive powder is provided. The method may include positioning the additive powder within a reactor chamber defined by the reactor; evacuating residual gases from the reactor chamber; increasing a reactor content temperature within the reactor chamber to a target temperature; agitating the additive powder; and injecting a gas mixture into the reactor chamber. The gas mixture includes a reactive gas for modifying a surface chemistry of the additive powder.

31 Claims, 6 Drawing Sheets

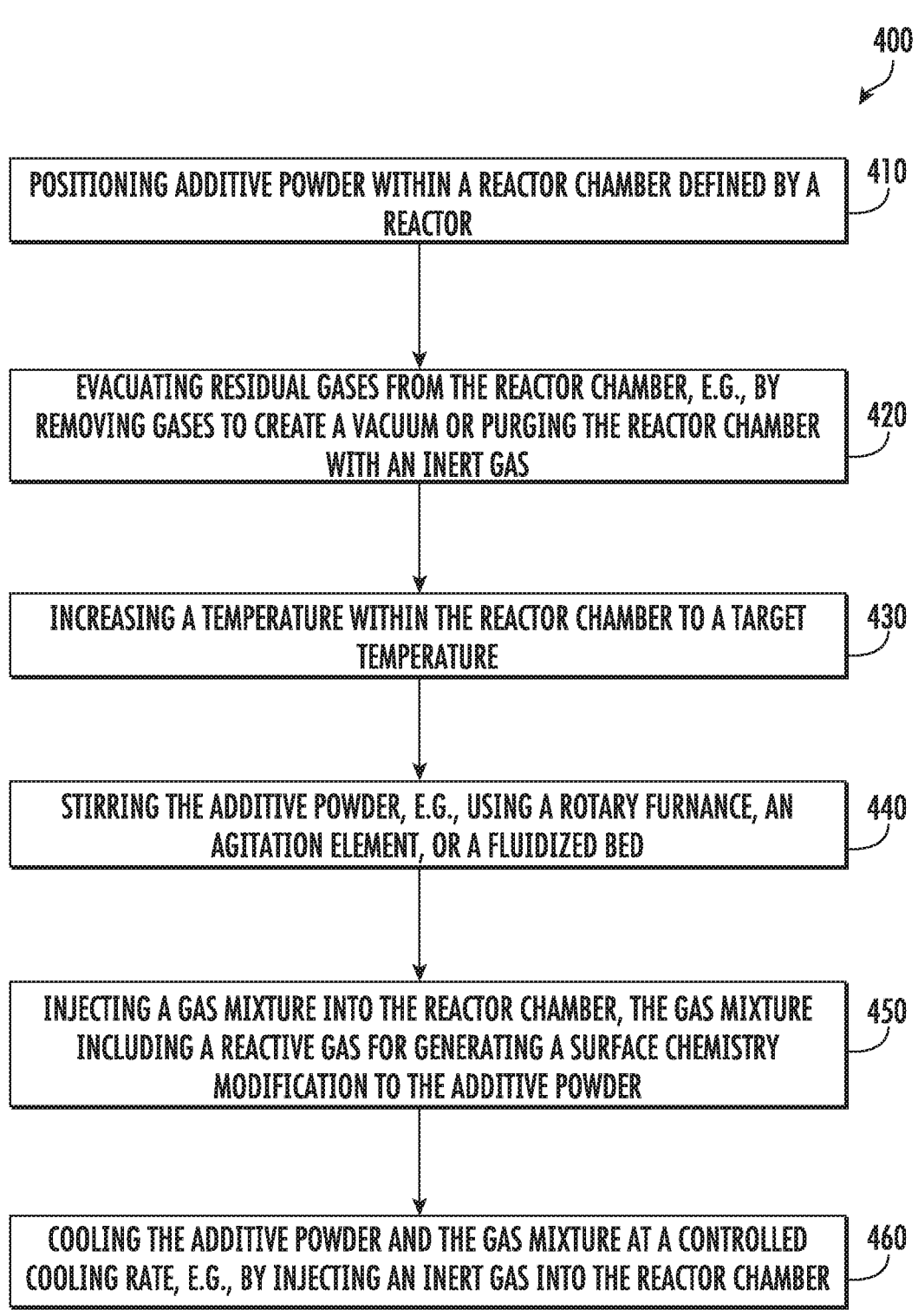

400

POSITIONING ADDITIVE POWDER WITHIN A REACTOR CHAMBER DEFINED BY A REACTOR — 410

EVACUATING RESIDUAL GASES FROM THE REACTOR CHAMBER, E.G., BY REMOVING GASES TO CREATE A VACUUM OR PURGING THE REACTOR CHAMBER WITH AN INERT GAS — 420

INCREASING A TEMPERATURE WITHIN THE REACTOR CHAMBER TO A TARGET TEMPERATURE — 430

STIRRING THE ADDITIVE POWDER, E.G., USING A ROTARY FURNANCE, AN AGITATION ELEMENT, OR A FLUIDIZED BED — 440

INJECTING A GAS MIXTURE INTO THE REACTOR CHAMBER, THE GAS MIXTURE INCLUDING A REACTIVE GAS FOR GENERATING A SURFACE CHEMISTRY MODIFICATION TO THE ADDITIVE POWDER — 450

COOLING THE ADDITIVE POWDER AND THE GAS MIXTURE AT A CONTROLLED COOLING RATE, E.G., BY INJECTING AN INERT GAS INTO THE REACTOR CHAMBER — 460

FIG. 3

SYSTEM AND METHOD FOR TREATING ADDITIVE POWDER

FIELD

The present disclosure generally relates to additive powders for use in additive manufacturing machines and processes, and more particularly to systems and methods for treating additive powder for improved flowability.

BACKGROUND

Additive manufacturing processes generally involve the buildup of one or more materials to make a net or near net shape (NNS) object, in contrast to subtractive manufacturing methods. Though "additive manufacturing" is an industry standard term, additive manufacturing encompasses various manufacturing and prototyping techniques known under a variety of additive manufacturing terms, including freeform fabrication, 3D printing, rapid prototyping/tooling, etc. Additive manufacturing techniques are capable of fabricating complex components from a wide variety of materials. Generally, a freestanding object can be fabricated from a computer aided design (CAD) model.

One common type of powder bed additive manufacturing process, referred to as electron beam melting (EBM), produces three-dimensional (3D) objects by using an electron beam to sinter, melt, or otherwise fuse a fine powder. Laser sintering or melting is also a notable additive manufacturing process which uses a laser beam to selectively fuse various material systems, such as engineering plastics, thermoplastic elastomers, metals, ceramics, etc. During both EBM and laser sintering/melting processes, the powder to be melted is spread evenly over a powder bed on a build platform, and the energy beam sinters or melts a cross sectional layer of the object being built under control of an electronic control unit or an emission directing device. The build platform is lowered and another layer of powder is spread over the powder bed and object being built, followed by successive melting/sintering of the powder. The process is repeated until the part is completely built up from the melted/sintered powder material.

Regardless the type of powder bed additive manufacturing process, the physical and chemical characteristics of the additive powder can impact the quality of the resulting object. That is, the properties of a component built through additive manufacturing depends on the metal powder itself, with higher quality powders (e.g., denser, cleaner, and more spherical) behaving more predictably and thus resulting in better parts. As such, high quality powder material is required for components formed from additive manufacturing techniques, particularly when used to manufacture components for gas turbine machinery and/or medical implant or device applications.

For example, the flowability of additive powder is an important characteristic that greatly affects the printing process. Specifically, an additive powder that has poor flowability may have a tendency to agglomerate or stick together on surface of the powder dispenser, on the recoating mechanism, or on other surfaces of the additive manufacturing machine. In addition, it may be difficult or impossible to evenly spread a layer of additive powder which has poor flowability, resulting in voids in the powder that can produce corresponding voids or defects in the finished part.

Accordingly, additive powder for use with an additive manufacturing machine which has improved physical and chemical characteristics would be useful. More particularly, a method for treating additive powder to improve flowability on a large scale would be particularly beneficial.

BRIEF DESCRIPTION

Aspects and advantages will be set forth in part in the following description, or may be obvious from the description, or may be learned through practice of the invention.

According to one embodiment of the present subject matter, a method of treating additive powder in a reactor is provided including positioning the additive powder within a reactor chamber defined by the reactor, evacuating residual gases from the reactor chamber, increasing a reactor content temperature within the reactor chamber to a target temperature, agitating the additive powder, and injecting a gas mixture into the reactor chamber, the gas mixture including a reactive gas for modifying a surface chemistry of the additive powder.

According to another exemplary embodiment, a powder treatment assembly for treating additive powder is provided. The powder treatment assembly includes a reactor defining a reactor chamber for receiving the additive powder, an evacuation subsystem fluidly coupled to the reactor chamber, and a heating assembly thermally coupled to the reactor chamber. An agitation element is movably mounted within the reactor chamber, a gas supply fluidly coupled to the reactor chamber, and a controller is configured for evacuating residual gases from the reactor chamber using the evacuation subsystem, increasing a reactor content temperature within the reactor chamber to a target temperature using the heating assembly, agitating the additive powder using the agitation element, and injecting a gas mixture into the reactor chamber using the gas supply, the gas mixture including a reactive gas for modifying a surface chemistry of the additive powder.

According to another embodiment, a method of treating additive powder in a reactor is provided. The method includes positioning the additive powder within a reactor chamber defined by the reactor, increasing a reactor content temperature within the reactor chamber to a target temperature, agitating the additive powder, and injecting a gas mixture into the reactor chamber, the gas mixture including a reactive gas for modifying a surface chemistry of the additive powder, wherein the concentration of the reactive gas in the gas mixture is between about 1 and 500 parts per million.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 3 is a method of treating additive powder in a reactor according to an exemplary embodiment of the present subject matter.

Figure 1:
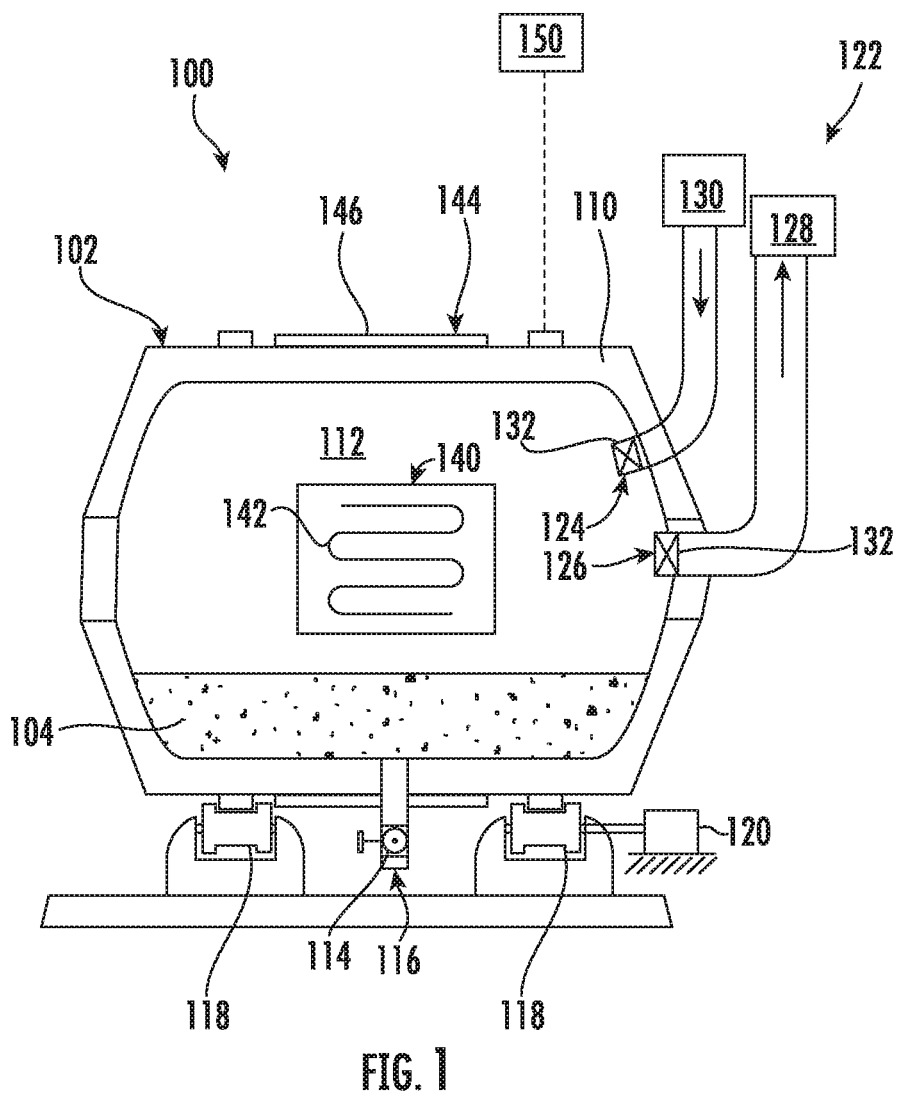
FIG. 1 shows a schematic view of a powder treatment assembly including a rotary furnace which may be used to treat additive powder according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

A system and method for treating additive powder includes a reactor configured for receiving a large volume of additive powder. An evacuation subsystem removes injected or residual gases from the reactor chamber by purging the chamber with an inert gas or drawing a vacuum within the chamber. A heating assembly raises the reactor content temperature of the reactor chamber while the additive powder is continuously stirred. A gas mixture including a small amount of reactive gas is injected into the reactor chamber to modify the surface chemistry of the additive powder before the additive powder is cooled down.

Referring now to FIG. 1, a schematic view of a powder treatment assembly 100 for treating additive powder will be described according to an exemplary embodiment of the present subject matter. Specifically, as illustrated, powder treatment assembly 100 includes a rotary reactor or rotary furnace 102 for receiving additive powder 104. As explained herein, powder treatment assembly 100 and the associated methods of operation are intended to treat additive powders for improved physical and chemical characteristics or properties, e.g., such as flowability and electron emission. By improving such properties, the additive manufacturing process may be improved and defects in the printed parts may be reduced.

According to an exemplary embodiment of the present subject matter, additive powder 104 may include at least one of nickel, cobalt, iron, titanium, and aluminum. Alternatively, additive powder 104 may generally refer to any suitable alloys or combinations of such materials, to any suitable additive manufacturing material powder, to any powder for use in a non-powder bed additive manufacturing technology, to a metal injection molding powder, or to a powder for any other suitable application. For example, additive powder 104 may be used in a direct metal laser melting process (DMLM), a binder jet process, a kinetic/ cold spray process, a directed energy deposition (powder flow) process, or any other suitable process. Moreover, although powder treatment assembly 100 is described herein as being used to modify the surface chemistry or physical properties of additive powder 104, it should be appreciated that according to alternative embodiments powder treatment assembly 100 may be used for performing any other suitable modification or treatment of any other material or composition.

As shown, rotary furnace 102 may include a furnace housing 110 that generally defines a chamber, referred to herein as a reactor chamber 112. Reactor chamber 112 is preferably capable of holding a large volume of additive powder 104 for a bulk treatment process. An outlet valve 114 may be operably coupled to a discharge port 116 on a sidewall of furnace housing 110 for providing selective access to reactor chamber 112. In addition, the sidewall of furnace housing 110 may be slanted toward discharge port 116 to facilitate gravity assisted removal of additive powder 104. According to still another embodiment, rotary furnace 102 may include a gas transport system (not shown) which includes gas supplies for filling and discharging furnace housing 110 to transport additive powder 104. As shown, rotary furnace 102 includes a plurality of rolling supports 118 for supporting furnace housing 110 during the treatment process. Specifically, rolling supports 118 may be driven by a drive motor 120 which is configured for selectively rotating furnace housing 110 during operation, e.g., to facilitate stirring or agitation of additive powder 104 stored therein.

In addition, powder treatment assembly 100 may include an evacuation subsystem 122 which is fluidly coupled to reactor chamber 112 for selectively evacuating gases from reactor chamber 112, such as residual gases. As used herein, the term "residual gas" and the like are intended to refer to injected gases, residual gases contained in the atmosphere prior to start-up, or other gases which are otherwise present but undesirable within reactor chamber 112. Specifically, evacuation subsystem 122 may include one or both of a gas inlet 124 and a gas outlet 126. One method of removing injected or residual gases from reactor chamber 112 may include generating a vacuum within reactor chamber 112. In this regard, a vacuum generating device or a vacuum pump 128 may be fluidly coupled to reactor chamber 112 through gas outlet 126. The vacuum pump 128 may be selectively operated to extract all gases from reactor chamber 112, creating a vacuum or at least a substantial or partial vacuum therein. It should be appreciated that as used herein, terms of approximation, such as "approximately," "substantially," or "about," refer to being within a ten percent margin of error.

Alternatively, injected or residual gases may be removed from reactor chamber 112 using a purge gas. In this regard, a gas supply 130 may be fluidly coupled to reactor chamber 112 through gas inlet 124. Inert gas can be selectively supplied from gas supply 130 to purge all residual gases from reactor chamber 112 through gas outlet 126. As used herein, the term "inert gas" and the like are intended generally to refer to gases which do not undergo chemical reactions within reactor chamber 112, such as noble gases or other suitable gases, such as Ar or He. According to exemplary embodiments, the reaction may take place at high pressure in a high pressure reactor chamber 112. Evacuation subsystem 122 may further include one or more valves 132 configured for opening and closing gas inlet 124 and gas outlet 126. It should be appreciated that other methods of removing injected or residual gases from reactor chamber 112 are possible and within the scope of the present subject matter.

According to still another embodiment, reactor chamber 112 may be prepared for the reaction by evacuating residual gases and providing an inert gas at a predetermined pressure suitable for facilitating the chemical reaction. In addition, according to exemplary embodiments, the chemical reaction could also occur at a lower pressure, e.g., below atmospheric pressure. Specifically, for example, evacuation subsystem 112 may be used to pump reactor chamber 112 to vacuum prior to using gas supply 130 to fill reactor chamber 112 with an inert gas or another suitable gas to a predetermined pressure. In this manner, by operating with a reactor chamber 112 that is pressurized or otherwise has a pressure above atmospheric pressure, leaks in furnace housing 110 will not result in contaminants being drawn into reactor chamber 112.

Powder treatment assembly 100 may further include one or more heating elements 140 which are generally configured for raising the reactor content temperature within reactor chamber 112. Specifically, as illustrated in FIG. 1, heating elements 140 including a gas heater 142, although alternative heating elements 140 are possible and within scope of the present subject matter. For example, heating elements 140 may include one or more of gas heaters, electrical resistance heating elements, induction heaters, plasma torches, hot gas supply systems, or any other suitable device or system of devices for heating the contents within reactor chamber 112.

As used herein, the term "reactor content temperature" and the like are intended to refer to an average temperature of the contents within a reactor, such as additive powder 104 within reactor chamber 112. In this regard, the reactor content temperature may generally represent the temperature of additive powder 104 which is being modified by the chemical reaction. For example, according to certain exemplary embodiments, the reactor content temperature may be an average temperature of all particles of additive powder 104. According to still other embodiments, reactor content temperature may refer to the lowest powder temperature within reactor chamber 112, the highest powder temperature within reactor chamber 112, or another suitable proxy for the thermal energy of additive powder 104 within reactor chamber 112. It should be appreciated that the term "temperature" may be used to refer to reactor content temperature when the context of use indicates such intent.

Notably, heating elements 140 may be configured for heating the contents of reactor chamber 112 to a target temperature at any suitable rate, e.g., less than 10° C. per minute, less than 5° C. per minute, etc. The target temperature may be greater than 500° C., greater than 700° C., greater than 800° C., greater than 1000° C., or any other suitable temperature. In addition, heating element 140 may maintain the chamber temperature at that target temperature for any suitable holding time or period, such as less than one hour, two hours, etc. Alternatively, the holding time or period could be less than 30 minutes, less than 10 minutes, less than a minute, or even less than 5 seconds. According to an exemplary embodiment, the holding period is inversely proportional to the target temperature. According to another embodiment, the reaction between additive powder 104 and the reactive gas can take place as long as the metal particles are sufficiently hot to allow the electronegative atoms and/or molecules to diffuse few tens of nanometers into the surface layer of the additive powder 104.

Referring still to FIG. 1, powder treatment assembly 100 may further include a cooling element 144 for selectively cooling contents within reactor chamber 112 (e.g., lowering a reactor content temperature). For example, according to the illustrated embodiment, cooling element 144 may include a cooling jacket 146 which is wrapped around an exterior of furnace housing 110 for receiving a flow of cooling liquid which reduces the temperature of furnace housing 110 and thus reactor chamber 112.

According to alternative embodiments, we can control reaction by duration of treatment, temperature, and concentration of reactive gas. For example, if an inert gas is injected to purge the reactive gas from reactor chamber 112, the reaction may be stopped even if additive powder 104 is still hot. According to still other embodiments, the contents of reactor chamber 112 may be cooled using purge gas. In this regard, gas supply 130 may supply a flow of purge gas through gas inlet 124 and into reactor chamber 112 to cool the contents therein. Notably, cooling element 144 may be configured for controlling the cooling rate of additive powder 104 or the contents of reactor chamber 112. For example, the cooling rate may be controlled to less than 5° C. per minute, less than 1° C. per minute, or any other suitable controlled cooling rate, e.g., for improving the treatment of additive powder 104.

According to an exemplary embodiment of the present subject matter, it may be desirable to introduce a treatment gas, a reactive gas, or another gas mixture into reactor chamber 112 to treat additive powder 104 positioned therein. Thus, according to such embodiments, gas supply 130 may be configured for providing the gas mixture into reactor chamber 112 which may include a portion of reactive gas.

Without being bound by any particular theory, contact between additive powder 104 and the reactive gas mixture may result in atoms and/or molecules of the reactive gas reacting with particles of additive powder 104 as these particles are being treated within reactor chamber 112. Accordingly, a first layer formed of a compound of the heated additive powder 104 with the reactive gas and that is depleting through the thickness is formed on the outer surface of the particles of the particles of additive powder 104. This layer may be thicker and deeper in the surface and may be located below the usual passivation layer that forms on a metal particle. For example, the compound of the heated additive powder 104 with the reactive gas in the depleted layer may be metal oxide, nitride, hydride, or halide. Since the atoms of the reactive gas are depleting through the thickness of the surface layer, it forms a non stoichiometric compound with the additive powder 104. Such compound may cause this first layer to have a substantially positive charge. In addition, for example, the second layer may have a substantially negative charge, and wherein the first layer and the second layer have a combined charge that is substantially neutral.

According to various embodiments, the reactive gas may be any suitable gas in any suitable quantity or concentration and may be supplied with or without an inert gas or other mixture gases. For example, the reactive gas may be one or more of nitrogen ($N_2$), nitrogen dioxide ($NO_2$), oxygen ($O_2$), carbon monoxide ($CO$), carbon dioxide ($CO_2$), hydrocarbons ($C_xH_y$), water vapor ($H_2O$), ammonia ($NH_3$), or any other suitable reactive gas, e.g., selected at least in part to produce a desired oxide, nitride, carbide, or other layer on additive powder 104.

For example, the at least one reactive gas may be an oxygen-containing gas. The expression "oxygen-containing gas" as used herein refers to a gas that contains at least one atom of oxygen. For example, such a gas may be $O_2$, $CO_2$, CO, $NO_2$, air, water vapor, ozone, etc., and mixtures thereof.

Alternatively, or additionally, the reactive gas may include any gas comprising electronegative atom or molecule. In this regard, for example, the reactive gas may include fluorine, chlorine, iodine, bromide, hydrogen-based, nitrogen-based, and carbon-based compounds. According to an exemplary embodiment, the reactive gas is a halogen-containing gas. For example, the halogen may be F, Cl, Br, or I. According to an exemplary embodiment, the at least one reactive gas is a hydrogen-containing gas. For example, the at least one reactive gas is a sulfur-containing gas. For example, the at least one reactive gas is a nitrogen-containing gas. For example, the at least one reactive gas is chosen from $O_2$, $H_2O$, CO, $CO_2$, $NO_2$, $N_2$, $NO_3$, $Cl_2$, $SO_2$, $SO_3$, and mixtures thereof.

Notably, the concentration of the reactive gas may vary significantly depending on the application. For example, the concentration of reactive gas may preferably vary depending on the reaction temperature, duration, gas composition, and other environmental or process factors. For example, it is desirable to create a surface layer on additive powder 104 that has a predetermined thickness for enhancing flowability, and reactive gas concentration may be instrumental in achieving such a surface layer or chemistry modification. Although exemplary percentages are provided below, it should be appreciated that the reactive gas concentration may vary depending at least in part on the factors described above while remaining within the scope of the present subject matter.

For example, following the theory that the electronegative atoms and/or molecules from the reactive gas become a surface additive on the particles of the additive powder 104, the amount of reactive gas injected via the gas mixture may be controlled as it varies, e.g., quasi linearly, with the volume or quantity of additive powder 104 having a predetermined particle size distribution. The amount of reactive gas needed to form one or more layers on the particles of additive powder 104 may be related to the total surface area of the particles which depends of the treatment quantity and particle size distributions. The concentration of the reactive gas and the thermal conditions of the metal particles may be used to determine the depleting layer depth of the one or more layers.

Further, following the theory that the electronegative atoms and/or molecules from the reactive gas become a surface additive on the particles of the additive powder 104, the amount of reactive gas injected with the gas mixture to form may be controlled as it varies with the temperature of the surface of the particles of the additive powder 104, or more generally, with the temperature within reactor chamber 112. The reaction rate $\phi$ of such chemical reaction of activation energy $E_\alpha$ generally follows an Arhenius relation with the temperature T:

$$\Phi \propto e^{\frac{-E_\alpha}{k \cdot T}}$$

Thus, the injection of the reactive gas at high temperature is more efficient and requires less reactive gas concentration to generate the ideal depletion depth and form the first layer on additive powder 104. The concentration of reactive gas may vary depending, for example, on the chamber temperature, the powder type, the gas mixture composition, the desired layer thickness or properties, and other suitable factors.

According to an exemplary embodiment, the percentage of the reactive gas may be less than 0.1% by volume or 1000 parts per million (ppm). According to still other embodiments, the reactive gas concentration within the gas mixture may be less than 0.05% by volume, or less than 500 ppm. According to another exemplary embodiment, the reactive gas concentration within the gas mixture may be less than 0.025% by volume, or less than 250 ppm. According to another exemplary embodiment, the reactive gas concentration within the gas mixture may be less than 0.01% by volume, or less than 100 ppm.

According to still other embodiments, the reactive gas concentration may be higher, such as greater than about 0.1% by volume or 1000 ppm, or between about 5 ppm and 500 ppm, between about 1500 ppm and 7000 ppm, between about 3000 ppm and 5000 ppm, about 4000 ppm, or greater than 10000 ppm. Other gases and concentrations may be used while remaining within scope of the present subject matter.

Powder treatment assembly 100 may further include any suitable processor or controller for regulating operation of powder treatment assembly 100. Specifically, as illustrated, powder treatment assembly 100 further includes a controller 150 which is operably coupled with valves 132, the drive motor 120 for rotating rolling supports 118, vacuum pump 128, and other components, sensors, etc. Controller 150 may include one or more memory devices and one or more microprocessors, such as general or special purpose microprocessors operable to execute programming instructions or micro-control code associated with an additive manufacturing process or process monitoring. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 2:
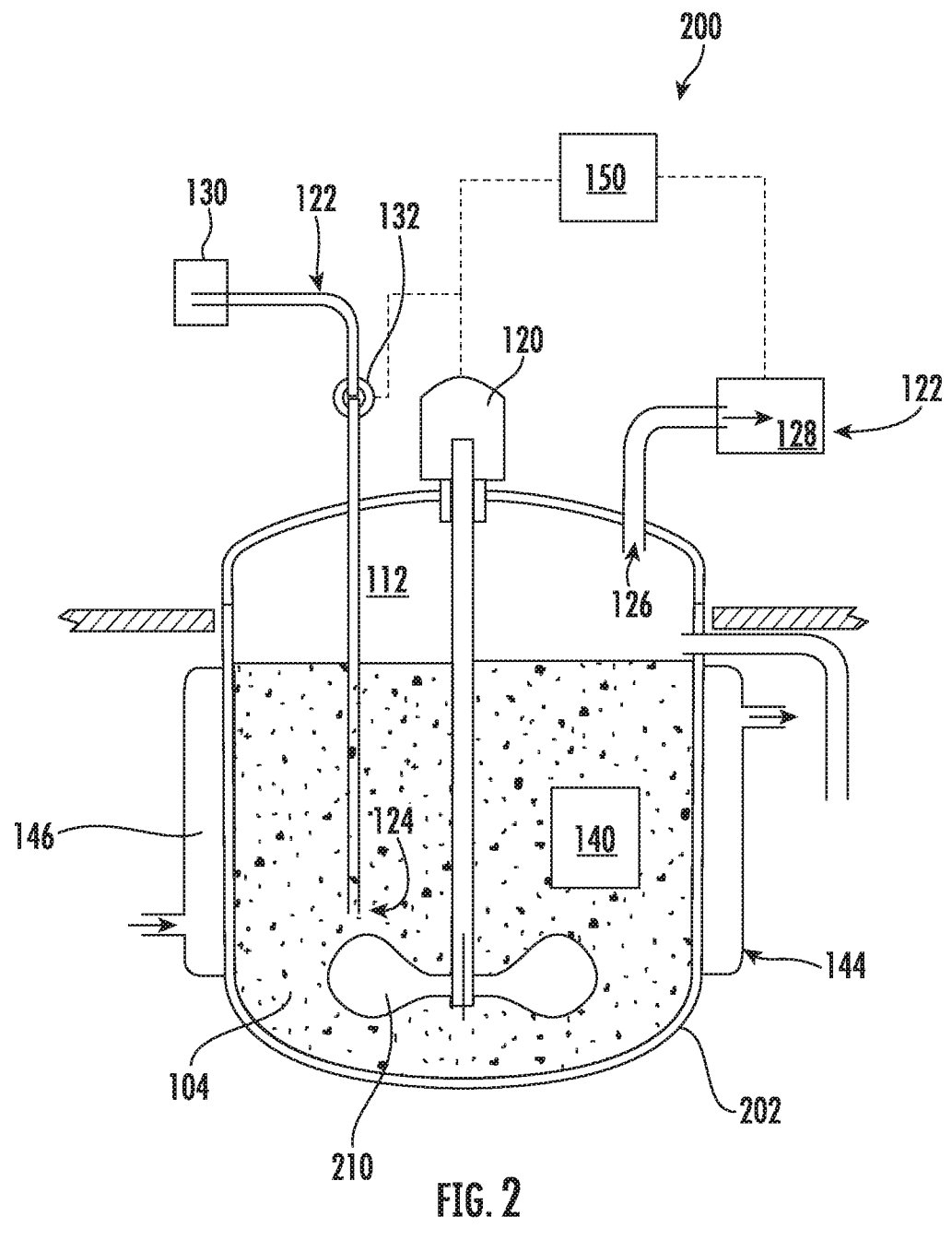
FIG. 2 shows a schematic view of a powder treatment assembly including a continuously stirred tank reactor which may be used to treat additive powder according to an exemplary embodiment of the present subject matter.

Referring now to FIG. 2, a schematic view of a powder treatment assembly 200 for treating additive powder will be described according to an exemplary embodiment of the present subject matter. Specifically, as illustrated, powder treatment assembly 200 includes a continuously stirred tank reactor 202 for receiving and treating additive powder 104. Due to the similarity between the powder treatment assemblies 100, 200 described herein, like reference numerals may be used to refer to the same or similar features between the various embodiments. In addition, it should be appreciated that features, components, and operating methods of these powder treatment assemblies 100, 200 may be interchangeable according to certain exemplary embodiments.

A primary difference between rotary furnace 102 and continuously stirred tank reactor 202 is the mechanism used for stirring or agitating additive powder 104. Specifically, as illustrated, continuously stirred tank reactor 202 includes an agitation element 210, which is illustrated herein as a rotatable paddle stirrer. Agitation element is rotatably mounted within reactor chamber 112 of continuously stirred tank reactor 202 and is mechanically coupled to drive motor 120. Drive motor 120 may be operably coupled to controller 150 and may be selectively operated to rotate agitation element 210, particularly when the temperature of additive powder 104 is elevated, to prevent agglomeration or sintering additive powder 104. Specifically, by processing additive powder 104 in this manner, the resulting treated additive powder 104 will have enhanced flowability and less agglomeration or clumping. According to alternative embodiments, agitation element 210 may be any suitable movable device for stirring or agitating additive powder 104.

According to still other embodiments, the agitation or stirring of additive powder 104 during the reaction may be achieved using a fluidized bed, e.g., by providing a gas flow beneath the powder which continuously stirs and mixes additive powder 104. Specifically, for example, in a fluidized bed reactor, a fluid (e.g., gas or liquid) may be passed through additive powder 104 at high enough velocities to partially suspend the additive powder and cause it to behave as though it were a fluid. Such a reactor ensures proper mixing and agitation of the contents of the reactor.

Now that the construction and configuration of powder treatment assemblies 100, 200 have been described according to exemplary embodiments of the present subject matter, an exemplary method 400 for operating a powder treatment assembly will be described according to an exemplary embodiment of the present subject matter. Method 400 can be used to operate powder treatment assembly 100, 200, or any other suitable powder treatment assembly. In this regard, for example, controller 150 may be configured for implementing some or all steps of method 400. Further, it should be appreciated that the exemplary method 400 is discussed herein only to describe exemplary aspects of the present subject matter, and is not intended to be limiting.

Referring now to FIG. 3, method 400 includes, at step 410, positioning additive powder within a reactor chamber defined by a reactor. For example, the reactor may be rotary furnace 102 or continuously stirred tank reactor 202. Step 420 includes evacuating injected or residual gases from the reactor chamber, e.g., by removing gases to create a vacuum or purging the reactor chamber with an inert gas. In this regard, evacuation subsystem 122 may be used to evacuate gases from reactor chamber 112 through gas outlet 126 and/or may introduce purge gas through gas inlet 124.

Step 430 includes increasing a temperature within the reactor chamber to a target temperature. In this regard, heating element 140 may be used to heat additive powder 104 and the contents of reactor chamber 112 to the target temperature, e.g., 800° C. Heating element 140 may then operate intermittently or continuously to maintain the chamber temperature of reactor chamber 112 at the target temperature to facilitate the surface treatment process. Step 440 includes stirring the additive powder, e.g., by rotating a rotary furnace or spinning an agitation element, e.g., in order to prevent agglomeration or sintering of additive powder 104 as its temperature increases during the heating process. Preferably, additive powder 104 is continuously stirred throughout the heating and cooling processes.

Step 450 includes injecting a gas mixture into the reactor chamber, the gas mixture including a reactive gas for modifying a surface chemistry of the additive powder. For example, the reactive gas may be a gas mixture including the very small percentage of nitrogen dioxide or another reactive gas, as described in detail above. Specifically, according to one embodiment, the amount of nitrogen dioxide in the gas mixture is less than 0.1% by volume or less than 1000 ppm, though other concentrations and gas mixtures are possible and within the scope of the present subject matter. Moreover, it should be appreciated that the reactive gas may be added continuously at a predetermined flow rate, periodically by implementing pulse injection, or in any other suitable volumes, flow rates, schedules, etc.

Step 460 includes cooling the additive powder and the gas mixture at a controlled cooling rate, e.g., by injecting an inert gas into the reactor chamber. In this manner, heating element 140 may be turned off and cool purge gas may be introduced into reactor chamber 112 through gas inlet 124 to slowly cool additive powder 104 in a controlled manner and at a controlled rate. According to still other embodiments, cooling fluid may be passed through cooling jacket 146 to facilitate the cooling of rotary furnace 102 and contents within reactor chamber 112. Alternatively, the reactive gas may be purged from the reactor chamber 112 to stop the chemical reaction regardless of the chamber temperatures. Although heating element 140 and cooling element 144 are described herein as being used independently, it should be appreciated that according to alternative embodiments, these components may be used simultaneously to achieve the desired heating or cooling rates.

FIG. 3 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using powder treatment assemblies 100 and 200 as an example, it should be appreciated that these methods may be applied to the operation of any suitable powder treatment assembly for treating any material, chemical composition, powder, etc.

The powder treatment assembly and methods of operation described herein facilitate the treatment of additive powder or other materials in a large scale to modify the surface chemistry or otherwise treat the additive powder to obtain enhanced flowability, e.g., a measure of the additive powders ability to act like a liquid, minimize sintering or agglomeration, and/or to modify secondary electron emissions from the additive powder. In this regard, for example, the powder treatment assembly may result in the diffusion of elements in the metal to produce a new layer with a different chemical composition that changes the surface energy and powder behavior. By treating the additive powder ex-situ prior to use in an additive manufacturing machine, powders may be treated at large scale and low cost and may having enhanced flowability and less clumping.

According to exemplary embodiments, this treatment would involve placing additive powders in a rotary furnace reactor or fluidized bed, purging or vacuuming the reactor chamber, and raising the temperature of the reactor chamber while stirring to prevent agglomeration or sintering. The method may further include injecting a gas mixture including a reactive gas (less than 1000 ppm) to modify a surface chemistry of powder to enhance flowability before the treated additive powder is cooled at a controlled cooling rate. The process may be used to treat additive manufacturing powders, metal injection molding powders, or powders for use in any other application. In addition, the powders may include one or more of Ni, Co, Fe, Ti, Al, alloys of such elements, or any other suitable materials or compositions.

It will be appreciated that processing powder in accordance with one or more of the exemplary embodiments and aspects described hereinabove may result in a powder (e.g., treated powder 110) formed of particles (e.g., treated particles 112) having characteristics to increase a flowability of such powder. For example, reference will now be made to FIGS. 4 through 6, explaining aspects of one or more particles of a powder processed in accordance with one or more of the exemplary embodiments and aspects described hereinabove.

Figure 4:
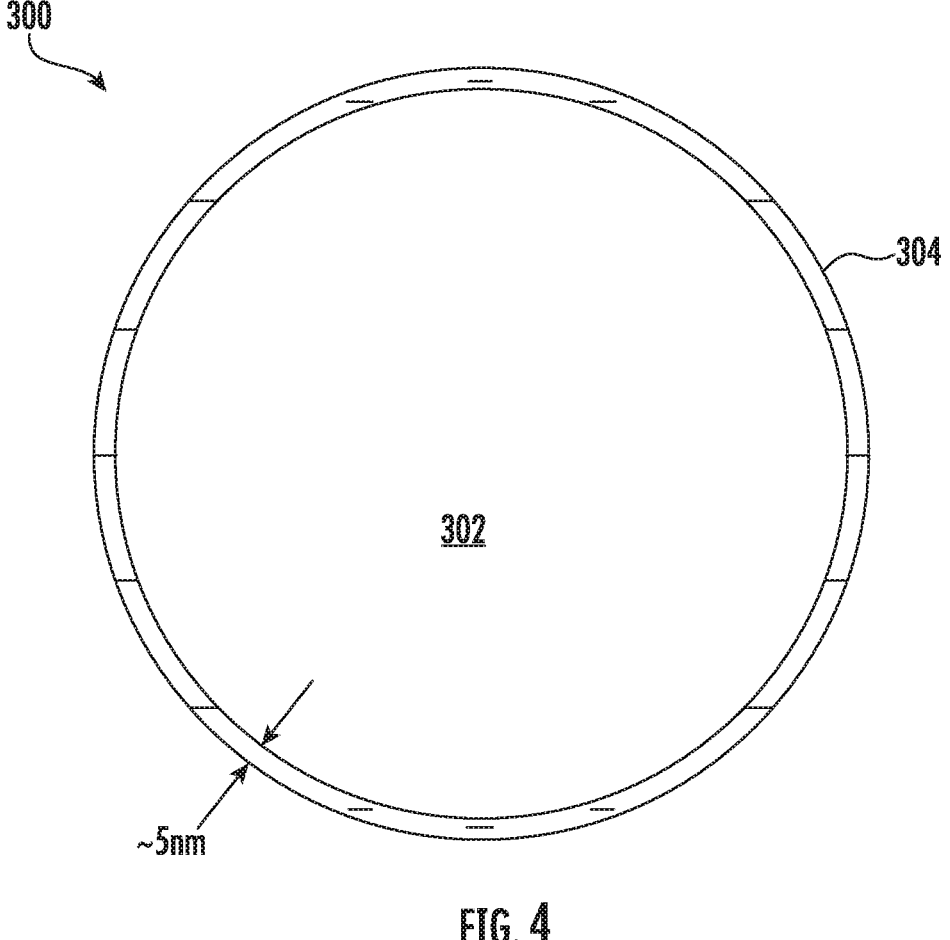
FIG. 4 is a method of treating additive powder using a powder treatment assembly according to an exemplary embodiment of the present subject matter.

First by way of background comparison, FIG. 4 illustrates a schematic diagram of a particle 300 of reactive metal powder formed according to an atomization processes in which the heated metal source is not contacted with an additive gas (which is referred to elsewhere herein as a reactive gas). The formed particle 300 generally includes a particle body 302 (for example a Ti-6Al-4V particle) and a surface native oxide layer 304. The surface native oxide layer 304 has a generally negative charge, which gives the formed particle 300 a net non-zero charge (i.e., for particle 302, Qnet≠0). Such negative charge may give the particle 300 a greater ability to polarize. The particle 302 may also include hydroxyl groups at the surface 304.

Figure 5:
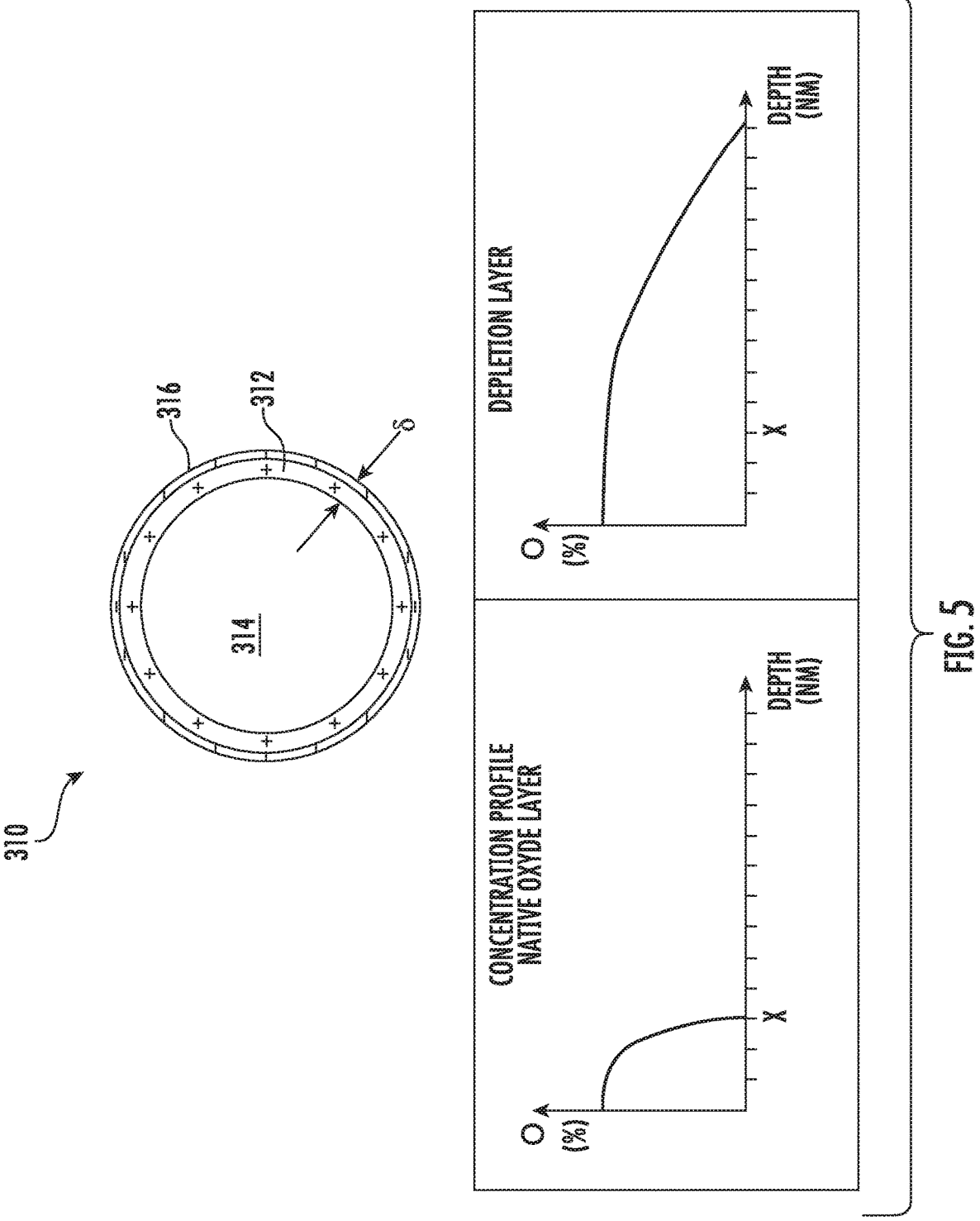
FIG. 5 is a schematic diagram of a particle of reactive metal powder processed without exposure to an additive gas.

By contrast, referring now to FIG. 5, a schematic diagram of a particle 310 of reactive metal powder processed in accordance with one or more of the exemplary embodiment and aspects described herein above in which a heated metal source or baseline powder is contacted with an additive gas. A first layer 312 (or layer 1) is formed on the outer surface of the particle body 314 (for example a Ti-6Al-4V particle). It results from the compounding of the baseline powder with the electronegative atoms and/or molecules that are depleting through the thickness. A second layer 316 (or layer 2) being a native oxide layer is further formed on the surface of the particle body 314. The first layer 312 and the second layer 316 may have a combined charge that is substantially neutral, thereby causing the formed particle 310 to have a substantially net zero charge (Qnet≈0) and a lower ability to polarize.

Following the theory that the electronegative atoms and/or molecules from the additive gas become a surface additive on the particles of the raw metal powder processed, the amount of additive gas injected during the processing steps described herein may be controlled as it varies quasi linearly with the processing rate of metal powder having a predetermined particle size distribution. The amount of additive gas needed to form the layer 1 is related to the total surface area of the metal particles which depends of the production rate and particle size distributions (see FIG. 6). The concentration of the additive gas and the thermal conditions of the metal particles will determine the depleting layer depth of the layer 1.

Figure 6:
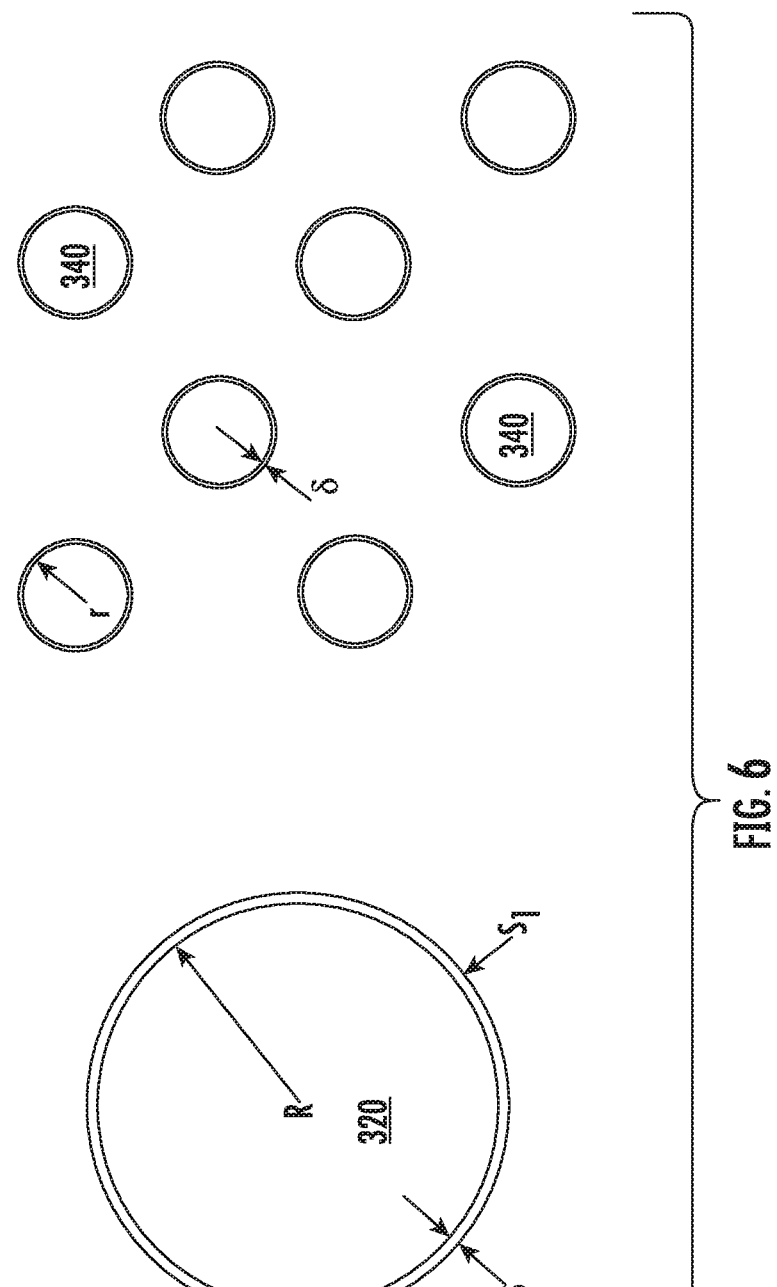
FIG. 6 is a schematic diagram of a particle of reactive metal powder processed according to one or more exemplary embodiment or aspects described herein.

Further following the theory that the electronegative atoms and/or molecules from the additive gas become a surface additive on particles of the raw metal powder formed, the amount of additive gas injected during the processing steps described herein may be controlled as it varies with the total area of the particles of the metal powder formed as shown in FIG. 6.

Further following the theory that the electronegative atoms and/or molecules from the additive gas become a surface additive on particles of the raw metal powder formed, the amount of additive gas injected during the processing steps may be controlled as it varies with the temperature of the surface of the particles of the raw metal powder formed. The reaction rate @ of such chemical reaction of activation energy E generally follows an Arhenius relation with the temperature T:

$$\phi \propto e^{-E/kT}$$

The injection of the additive gas at high temperature may thus be more efficient and may require less additive gas concentration to generate a desired depletion depth and form the layer 1.

FIG. 6 illustrates a schematic diagram of a particle 320 having a radius R and a depletion depth of δ at the surface 322 of the particle 320. The total surface area of the particle is $S1=4\pi R^2$.

FIG. 6 further illustrates a schematic diagram of a plurality of particles (n particles) 340 of the same size having the same total mass as the mass of the particle 320. The particles 340 are smaller in size than particle 320 but they have a larger surface area in total than particle 320. each particle 340 having a radius r and the total number of particles being $n=R3/r3$. The combined surface area of the particles 340 is $S2=n4\pi r2=R/rS1$. It increases linearly with decreasing radius of particles.

The amount of surface additive added is thus a function of the total surface area as the volume that will be treated is the product of the total surface area by the depletion depth.

For example, the obtained metal powders can have less than about 100 150, 200, 300, 500, 1000 or 1500 ppm of an electronegative atom and/or molecule (for example an electronegative atom and/or molecule element that is comprised within the additive gas used to produce the powder).

Further aspects of the invention are provided by the subject matter of the following clauses:

1. A method of treating additive powder in a reactor, the method comprising: positioning the additive powder within a reactor chamber defined by the reactor; evacuating residual gases from the reactor chamber; increasing a reactor content temperature within the reactor chamber to a target temperature; agitating the additive powder; and injecting a gas mixture into the reactor chamber, the gas mixture including a reactive gas for modifying a surface chemistry of the additive powder.

2. The method of any preceding clause, wherein evacuating the residual gases from the reactor chamber comprises: removing gases from the reactor chamber to create a vacuum within the reactor chamber; and providing an inert gas into the reactor chamber to a predetermined pressure.

3. The method of any preceding clause, wherein evacuating the residual gases from the reactor chamber comprises: purging the reactor chamber with an inert gas.

4. The method of any preceding clause, further comprising: lowering the reactor content temperature at a controlled cooling rate.

5. The method of any preceding clause, wherein that controlled cooling rate is less than 5 degrees Celsius per minute.

6. The method of any preceding clause, wherein the controlled cooling rate is less than 1 degrees Celsius per minute.

7. The method of any preceding clause, wherein lowering the reactor content temperature comprises: injecting an inert gas into the reactor chamber.

8. The method of any preceding clause, wherein the target temperature is greater than 500 degrees Celsius.

9. The method of any preceding clause, wherein the target temperature is greater than 700 degrees Celsius.

10. The method of any preceding clause, wherein the target temperature is greater than 1000 degrees Celsius.

11. The method of any preceding clause, further comprising: holding the reactor content temperature of the reactor chamber at the target temperature for a holding period.

12. The method of any preceding clause, wherein the holding period is inversely proportional to the target temperature.

13. The method of any preceding clause, wherein the step of increasing the reactor content temperature within the reactor chamber to the target temperature comprises heating at a controlled heating rate.

14. The method of any preceding clause, wherein that controlled heating rate is less than 10 degrees Celsius per minute.

15. The method of any preceding clause, wherein the reactive gas comprises at least one of nitrogen (N2) or nitrogen dioxide (NO2).

16. The method of any preceding clause, wherein the reactive gas comprises oxygen (O2).

17. The method of any preceding clause, wherein the reactive gas comprises carbon dioxide.

18. The method of any preceding clause, wherein the reactive gas comprises a hydrocarbon.

19. The method of any preceding clause, wherein the reactive gas comprises water vapor (H2O).

20. The method of any preceding clause, wherein the percentage of the reactive gas is less than 0.1% by volume or 1000 parts per million.

21. The method of any preceding clause, wherein the percentage of the reactive gas is between about than 1000 ppm and 10000 ppm.

22. The method of any preceding clause, wherein the percentage of the reactive gas is between about than 5 ppm and 500 ppm.

23. The method of any preceding clause, wherein the additive powder comprises Aluminum.

24. The method of any preceding clause, wherein the additive powder comprises Titanium.

25. The method of any preceding clause, wherein the additive powder comprises Nickel.

26. The method of any preceding clause, further comprising: providing the additive powder to an electron beam machine for an additive manufacturing process.

27. The method of any preceding clause, wherein the reactor comprises a rotary furnace and the step of stirring the additive powder comprising rotating the rotary furnace.

28. The method of any preceding clause, wherein the reactor comprises a continuously stirred tank reactor comprising one or more agitation elements for stirring the additive powder.

29. The method of any preceding clause, wherein the reactor comprises a fluidized bed reactor and stirring the additive powder comprises providing a flow of high speed gas through the additive powder.

30. A powder treatment assembly for treating additive powder, the powder treatment assembly comprising: a reactor defining a reactor chamber for receiving the additive powder; an evacuation subsystem fluidly coupled to the reactor chamber; a heating assembly thermally coupled to the reactor chamber; an agitation element movably mounted within the reactor chamber; a gas supply fluidly coupled to the reactor chamber; and a controller configured for: evacuating residual gases from the reactor chamber using the evacuation subsystem; increasing a reactor content temperature within the reactor chamber to a target temperature using the heating assembly; agitating the additive powder using the agitation element; and injecting a gas mixture into the reactor chamber using the gas supply, the gas mixture including a reactive gas for modifying a surface chemistry of the additive powder.

31. The powder treatment assembly of any preceding clause, wherein the evacuation subsystem evacuates gases by purging the reactor chamber with an inert gas, and wherein the controller if further configured for: lowering the reactor content temperature at a controlled cooling rate.

32. The powder treatment assembly of any preceding clause, wherein the agitation element comprises a rotary furnace.

33. The powder treatment assembly of any preceding clause, wherein the agitation element comprises a paddle stirrer rotatably mounted within the reactor chamber.

34. The powder treatment assembly of any preceding clause, wherein the agitation element comprises a flow of high speed gas in a fluidized bed reactor.

35. A method of treating additive powder in a reactor, the method comprising: positioning the additive powder within a reactor chamber defined by the reactor; increasing a reactor content temperature within the reactor chamber to a target temperature; stirring the additive powder; and injecting a gas mixture into the reactor chamber, the gas mixture including a reactive gas for modifying a surface chemistry of the additive powder, wherein the concentration of the reactive gas in the gas mixture is between about 1 and 500 parts per million.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of treating additive powder in a reactor, the method comprising:

positioning the additive powder within a reactor chamber defined by the reactor;

evacuating residual gases from the reactor chamber;

increasing a reactor content temperature within the reactor chamber to a target temperature;

agitating the additive powder; and while agitating the additive powder, injecting a gas mixture into the reactor chamber, the gas mixture including a reactive gas for modifying a surface chemistry of the additive powder to obtain a modified surface chemistry, wherein the gas mixture includes the reactive gas in a percentage that is less than 0.1% by volume or 1000 parts per million of the gas mixture such that the modified surface chemistry of the additive powder has a more net neutral charge than the surface chemistry of the additive powder and the additive powder with the modified surface chemistry has an improved flowability than the additive powder without the modified surface chemistry.

2. The method of claim 1, wherein evacuating the residual gases from the reactor chamber comprises:

removing gases from the reactor chamber to create a vacuum within the reactor chamber; and providing an inert gas into the reactor chamber to a predetermined pressure.

3. The method of claim 1, wherein evacuating the residual gases from the reactor chamber comprises:

purging the reactor chamber with an inert gas.

4. The method of claim 1, further comprising:

lowering the reactor content temperature at a controlled cooling rate.

5. The method of claim 4, wherein that controlled cooling rate is less than 5 degrees Celsius per minute.

6. The method of claim 4, wherein the controlled cooling rate is less than 1 degrees Celsius per minute.

7. The method of claim 4, wherein lowering the reactor content temperature comprises:

injecting an inert gas into the reactor chamber.

8. The method of claim 1, wherein the target temperature is greater than 500 degrees Celsius.

9. The method of claim 1, wherein the target temperature is greater than 700 degrees Celsius.

10. The method of claim 1, wherein the target temperature is greater than 1000 degrees Celsius.

11. The method of claim 1, further comprising:

holding the reactor content temperature of the reactor chamber at the target temperature for a holding period.

12. The method of claim 11, wherein the holding period is inversely proportional to the target temperature.

13. The method of claim 1, wherein the step of increasing the reactor content temperature within the reactor chamber to the target temperature comprises heating at a controlled heating rate.

14. The method of claim 13, wherein that controlled heating rate is less than 10 degrees Celsius per minute.

15. The method of claim 1, wherein the reactive gas comprises at least one of nitrogen ($N_2$) or nitrogen dioxide ($NO_2$).

16. The method of claim 1, wherein the reactive gas comprises oxygen ($O_2$).

17. The method of claim 1, wherein the reactive gas comprises carbon dioxide.

18. The method of claim 1, wherein the reactive gas comprises a hydrocarbon.

19. The method of claim 1, wherein the reactive gas comprises water vapor ($H_2O$).

20. The method of claim 1, wherein the percentage of the reactive gas is between about 1000 ppm and 10000 ppm.

21. The method of claim 1, wherein the percentage of the reactive gas is between about 5 ppm and 500 ppm.

22. The method of claim 1, wherein the additive powder comprises Aluminum.

23. The method of claim 1, wherein the additive powder comprises Titanium.

24. The method of claim 1, wherein the additive powder comprises Nickel.

25. The method of claim 1, further comprising:

providing the additive powder to an electron beam machine for an additive manufacturing process.

26. The method of claim 1, wherein the reactor comprises a rotary furnace and the step of stirring the additive powder comprising rotating the rotary furnace.

27. The method of claim 1, wherein the reactor comprises a continuously stirred tank reactor comprising one or more agitation elements for stirring the additive powder.

28. The method of claim 1, wherein the reactor comprises a fluidized bed reactor and stirring the additive powder comprises providing a flow of high speed gas through the additive powder.

29. A method of treating additive powder in a reactor, the method comprising:

positioning the additive powder within a reactor chamber defined by the reactor;

increasing a reactor content temperature within the reactor chamber to a target temperature;

stirring the additive powder; and injecting a gas mixture into the reactor chamber, the gas mixture including a reactive gas for modifying a surface chemistry of the additive powder to obtain a modified surface chemistry, the modified surface chemistry of the additive powder having a more net neutral charge than the surface chemistry of the additive powder, wherein the concentration of the reactive gas in the gas mixture is between about 1 and 500 parts per million.

30. The method of claim 1, wherein the obtained additive powder has less than 100 ppm of an electronegative atom after injecting the gas mixture into the reaction chamber.

31. The method of claim 1, wherein the obtained additive powder has less than 1000 ppm of an electronegative atom after injecting the gas mixture into the reaction chamber.

* * * * *